Figure 1:
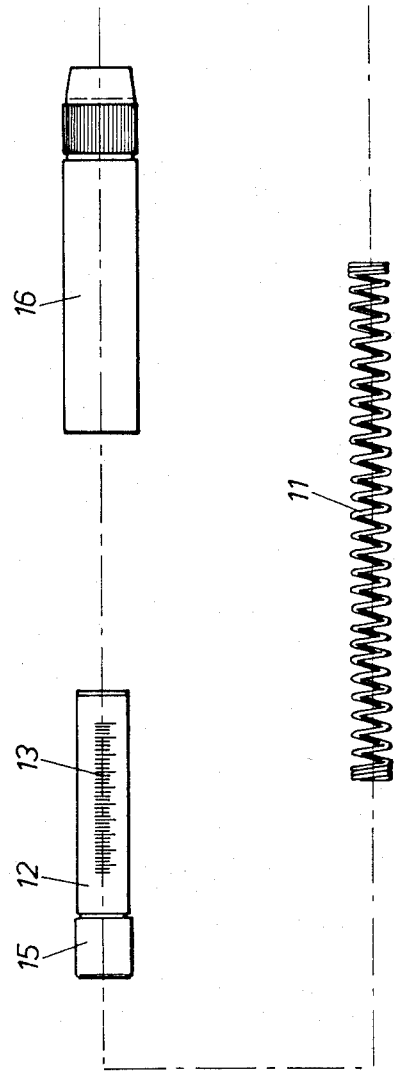
Figure 1:
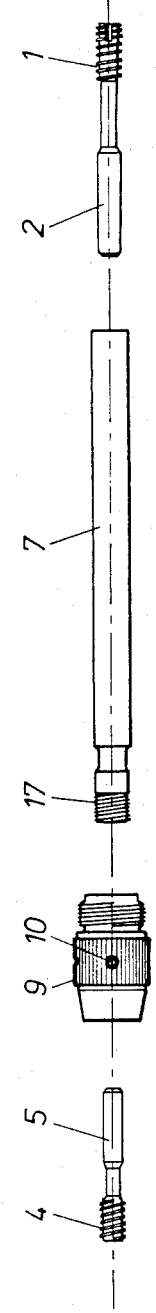

United States Patent [19]

Larsen

[11] Patent Number: 4,858,330
[45] Date of Patent: Aug. 22, 1989

[54] THREAD MEASURING TOOL

[76] Inventor: Leif G. Larsen, Sibbevej 10, Graested, Denmark, 3230

[21] Appl. No.: 225,752
[22] PCT Filed: Dec. 14, 1987
[86] PCT No.: PCT/DK87/00157
  § 371 Date: Jul. 26, 1988
  § 102(e) Date: Jul. 26, 1988
[87] PCT Pub. No.: WO88/04763
  PCT Pub. Date: Jun. 30, 1988

[30] Foreign Application Priority Data

Dec. 17, 1986 [DK] Denmark .............................. 6101/86

[51] Int. Cl.⁴ ................................................ G01B 3/48
[52] U.S. Cl. .................................. 33/199 R; 33/178 B
[58] Field of Search .............. 33/199 R, 169 B, 178 B

[56] References Cited

U.S. PATENT DOCUMENTS

| | | | |
|---|---|---|---|
| 1,459,896 | 6/1923 | John .................................. | 33/169 B |
| 1,654,233 | 12/1927 | Bath . | |
| 2,330,453 | 9/1943 | Smith ................................ | 33/199 R |
| 2,861,347 | 11/1958 | Tarnik .......................... | 33/199 R X |
| 3,015,892 | 1/1962 | Stuart ................................ | 33/169 B |
| 4,519,144 | 5/1985 | Larsen ............................... | 33/199 R |

FOREIGN PATENT DOCUMENTS 147350 4/1982 Denmark .
WO83/03664 10/1983 PCT Int'l Appl. .

OTHER PUBLICATIONS

IBM Tech. Disc. Bulletin J. F. Straitwell "Thread Depth Measurement" vol. 13 #5 10/70.

*Primary Examiner*—Harry N. Haroian
*Attorney, Agent, or Firm*—Darby & Darby

[57] ABSTRACT

When using a thread measuring tool with a "go" plug gauge (1) and a "no go" plug gauge (4) and scale (13) indicating the thread depth, the gauge is worn or damaged so that the tool must be discarded.

By providing the tool with interchangeable gauges (1, 4), as referred to in the application, it is possible to replace the worn or damaged gauge in that the gauge is placed on a shank (2, 5) which can be inserted into a tapered bore (3, 6) in a rod (7). The rod extends inside the housing (16) of the tool. When for instance a plug gauge (1) is worn down, it is extracted from the rod (7) and a new one is inserted.

In order to be able to adjust the tool, the rod (7) is provided with an external thread (17) so that it can be screwed in and out of the housing (16) and thus be adjusted so that the end of the plug gauge holder (12) will just flush with the end of the plug gauge (1).

10 Claims, 3 Drawing Sheets

THREAD MEASURING TOOL

The invention relates to a thread measuring tool with a "go" plug gauge and a "no go" plug gauge, said gauges being arranged in a housing, and were a plug gauge holder with a measuring value indicator is arranged around the plug gauge, which holder can be inserted telescopically into the housing against a spring.

Thread measuring tools of this type can be used for checking the tolerances of the thread holes while the thread depth can be read direct from a measuring value indicator.

By the hitherto known tools the "go" plug gauge and the "no go" plug gauge are designed at each end of a through-going spindle extending through the housing.

In use these plug gauges can be damaged and they are worn. When one or both plug gauges do no longer meet the requirements in respect of tolerance, shape etc., the whole tool must be discarded or at best be provided with a new spindle with plug gauge.

The replacement of the spindle with plug gauges can normally only take place while at the same time adjusting the measuring value indicator of the tool, because the plug gauge must be flush with the end of the plug gauge holder in order to provide an accurate reading of the thread depth.

Therefore, the tool will normally be discarded when the plug gauges do no longer meet the tolerance requirements, which is a source of considerable disadvantages and expenses for the consumer.

Add to this that a measuring tool for each thread type and thread size must be used. This requires a considerable number of measuring tools which is expensive for the consumer who may only occasionally require thread check.

It is the object of the invenytion to overcome these shortcomings of the known measuring tools, and this is achieved by a tool where the gauges are each situated on a shank which can be attached to a rod extending inside the housing.

Considerable advantages in use and by way of reduced costs are hereby obtained. First of all the replacement of a worn down or damaged gauge is simple and comparatively inexpensive. It will thus suffice to replace only one gauge thereby saving money for the replacement of the other gauge. Add to this that other sizes of plug gauges can be placed in the same tool whereby both the field of tolerance as well as thread types and sizes can be varied within a wide framework within the one and same tool. This provides large practical advantages and reduces the costs considerably.

By being able to attach the shank of the gauges in a bore, a reliable and accurate mounting of the gauge is obtained by a slight conicity.

By, as presented in claim 4, being able to adjust the position of the spindle in the housing, the measuring value indicator of the tool can be adjusted exactly to the plug gauge.

Finally, it is expedient, as presented in claim 5, to adjust by screwing the rod into the housing.

Figure 2:
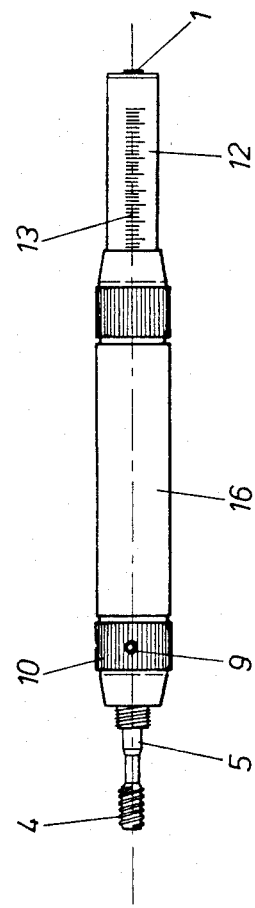
Figure 3:
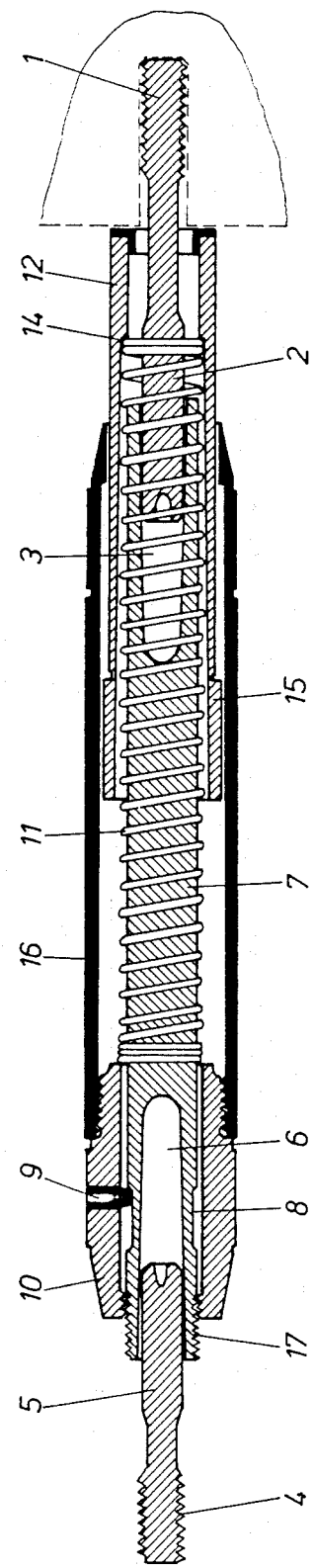

In the following invention will be described in further detail with reference to the drawing, where FIG. 1 shows the individual parts of the tool,
FIG. 2 shows the assembled tool, and
FIG. 3 is a section through the tool on a larger scale.

The drawing shows an example of a preferred embodiment of the thread measuring tool.

The individual parts, cf. particularly FIG. 1, comprise a through-going spindle 7 being provided with a bore 3, 6, said bores being somewhat pointed towards the bottom for the formation of a tapered guide for the shanks 2, 5 of the plug gauges.

The plug gauge 1 is provided with a cylindrical shank 2, and similarly the "no go" plug gauge 4 is provided with a cylindrical shank 5. By pressing the shank 2, 5 into the tapered bore 3, 6 the gauge is held fixedly and accurately in the spindle 7.

Moreover, the spindle 7 is at one end is provied with an external thread 17 which can be screwed into an interacting inside thread in a thread bushing 10 forming the one end of the housing. By means of this thread 17, the spindle 7 can be adjusted in relation to the housing in that the spindle can be screwed in and out. In order to be able to lock the spindle 7 in the housing, a stop screw 9 is screwed into the thread bushing 10, which stop screw 9 can be screwed down to abut the spindle 7 in a shoulder 8.

The remaining part of the housing comprises a tube 16 into which the thread bushing 10 can be screwed. In the opposite end of the housing 16 this is somewhat pointed and is moreover cut off straight. This is in order to read the depth accurately, said depth being read from a measuring indicator 13 placed on the outside of the plug gauge holder 12. This is constructed as a tube with a sliding guide member 15 at the inner end, which guide member can slide inside the housing 16, cf. FIG. 3.

Inside, the gauge holder 12 is provided with a recess 14, on which a coil spring 11 can abut. The opposite end of the spring abuts the end flange of the thread bushing 10 in the housing.

The spring 11 presses the gauge holder 12 outwards so that it can slide out and cover the plug gauge 1, as shown in FIG. 2.

The entire measuring tool can be assembled in the manner shown in FIG. 1. Once the tool is assembled, it appears as shown in FIG. 2. The plug gauge 1 is hidden by the gauge holder 12, and the tool is ready for use.

In FIG. 3 the tool is shown in use in that it is screwed down into a thread hole being indicated by the dotted line. It is seen that the gauge holder 12 is inserted into the housing, and the length, and hence the depth, of the thread can be read from the measuring indicator 13 against the end edge of the housing 16.

The two plug gauges 1, 4 can be removed and replaced by others, if so required. The tool can perhaps be adjusted if the plug gauge 1 is no longer flush with the end of the plug gauge holder 12. This takes place by releasing the stop screw 9 and turning the gauge 1 and spindle 7 until the gauge is flush with the end of the gauge holder. The tool is then adjusted and will provide an exact indication of the thread depth.

I claim:
1. A thread measuring tool comprising:
   an elongated hollow housing having first and second ends;
   a tubular gauge member axially movable within said housing and having one end for projecting from said first housing end,
   a spindle having one end extending within said gauge member and being axially movable relative to the gauge member;
   a plug gauge at said one spindle end for projecting beyond said one end of said gauge member,
   means for detachably connecting the other end of the spindle to said housing second end comprising mating threaded means on said spindle other end and housing second end to permit axial initial positioning of said gauge member relative to said housing and detachment of the spindle from the housing second end for removal of the spindle through said housing first end, means acting between said housing and said gauge member for biasing said gauge member one end outwardly of said housing first end and over said plug gauge, movement of said plug gauge into the hole of a piece with said gauge member one end engaging said piece causing said gauge member to move axially of said housing by an amount corresponding to the movement of the plug gauge into the hole.

2. A thread measuring tool as in claim 1 wherein said one end of said spindle is hollow, said plug gauge being detachably mounted to said spindle hollow one end.

3. A thread measuring tool as in claim 1 wherein indicia are on the outer surface of said gauge member for displaying the amount of axial movement of said gauge member relative to the housing as the plug gauge is moved into the hole.

4. A thread measuring tool as in claim 1 wherein said threaded means at said housing second end comprises a hollow cap with internal threads to accept the threaded means of the spindle other end.

5. A thrad measuring tool as in claim 4 further comprising screw means on said cap extending into the interior thereof to engage and lock the spindle other end.

6. A thread measuring tool as in claim 2 wherein the other end of said spindle is hollow, and second plug gauge means detachably mounted to the hollow other end of said spindle.

7. A thread measuring tool as in claim 5 wherein the other end of said spindle is hollow, and second plug gauge means detachably mounted to the hollow other end of said spindle.

8. A thread measuring tool as in claim 7 wherein the hollow spindle end and the plug gauge means mounted thereto are both cylindrical and tapered in a mating manner.

9. A thread measuring tool as in claim 5 wherein each hollow spindle end and the respective plug gauge to be mounted thereto are both cylindrical and tapered in a corresponding manner.

10. A thread measuring tool as in claim 1 wherein said biasing means comprises a spring extending along a part of the length of said spindle and having one end acting against the housing and the other end against said gauge member.

* * * * *